United States Patent [19]
Nitta

[11] Patent Number: 5,153,717
[45] Date of Patent: Oct. 6, 1992

[54] COLOR CAMERA OF SURFACE-SEQUENCE SYSTEM

[75] Inventor: Keiichi Nitta, Kawasaki, Japan

[73] Assignee: Nikon Corporation, Tokyo, Japan

[21] Appl. No.: 664,820

[22] Filed: Mar. 5, 1991

[30] Foreign Application Priority Data

Mar. 9, 1990 [JP] Japan .................................. 2-58755

[51] Int. Cl.$^5$ ................................................ H04N 7/18
[52] U.S. Cl. ...................................... 358/98; 358/163; 358/42
[58] Field of Search ...................... 358/42, 41, 43, 44, 358/98, 163; 128/6, 4

[56] References Cited

U.S. PATENT DOCUMENTS

| | | | |
|---|---|---|---|
| 3,919,473 | 11/1975 | Cotter | 358/163 |
| 4,590,520 | 9/1986 | Frame et al. | 358/163 |
| 4,593,313 | 6/1986 | Nagasaki et al. | 358/98 |
| 4,631,582 | 12/1986 | Nagasaki et al. | 358/42 |
| 4,633,314 | 12/1986 | Kurata et al. | 358/163 |
| 4,667,229 | 5/1987 | Cooper et al. | 358/98 |
| 4,716,457 | 12/1987 | Matsuo | 358/98 |
| 4,742,388 | 5/1988 | Cooper et al. | 358/98 |
| 4,821,099 | 4/1989 | Sakamoto | 358/163 |
| 4,920,428 | 4/1990 | Lin et al. | 358/163 |

Primary Examiner—John K. Peng
Assistant Examiner—Michael H. Lee
Attorney, Agent, or Firm—Shapiro and Shapiro

[57] ABSTRACT

A color camera of a surface-sequence system comprises a rotational filter having a plurality of filtering parts respectively for red, green, and blue color signals, an image pick up for sequentially converting the incident light transmitted from an object image through the rotational filter into each of the electrical color signals, an amplifier capable of varying amplification factors for amplifying each of the color signals from the image pick up, and a correcting device for controlling the amplification factors of the amplifier in accordance with each of the characteristics of the plural filtering parts of the rotational filter when each of the color compositions of image signals is amplified.

3 Claims, 4 Drawing Sheets

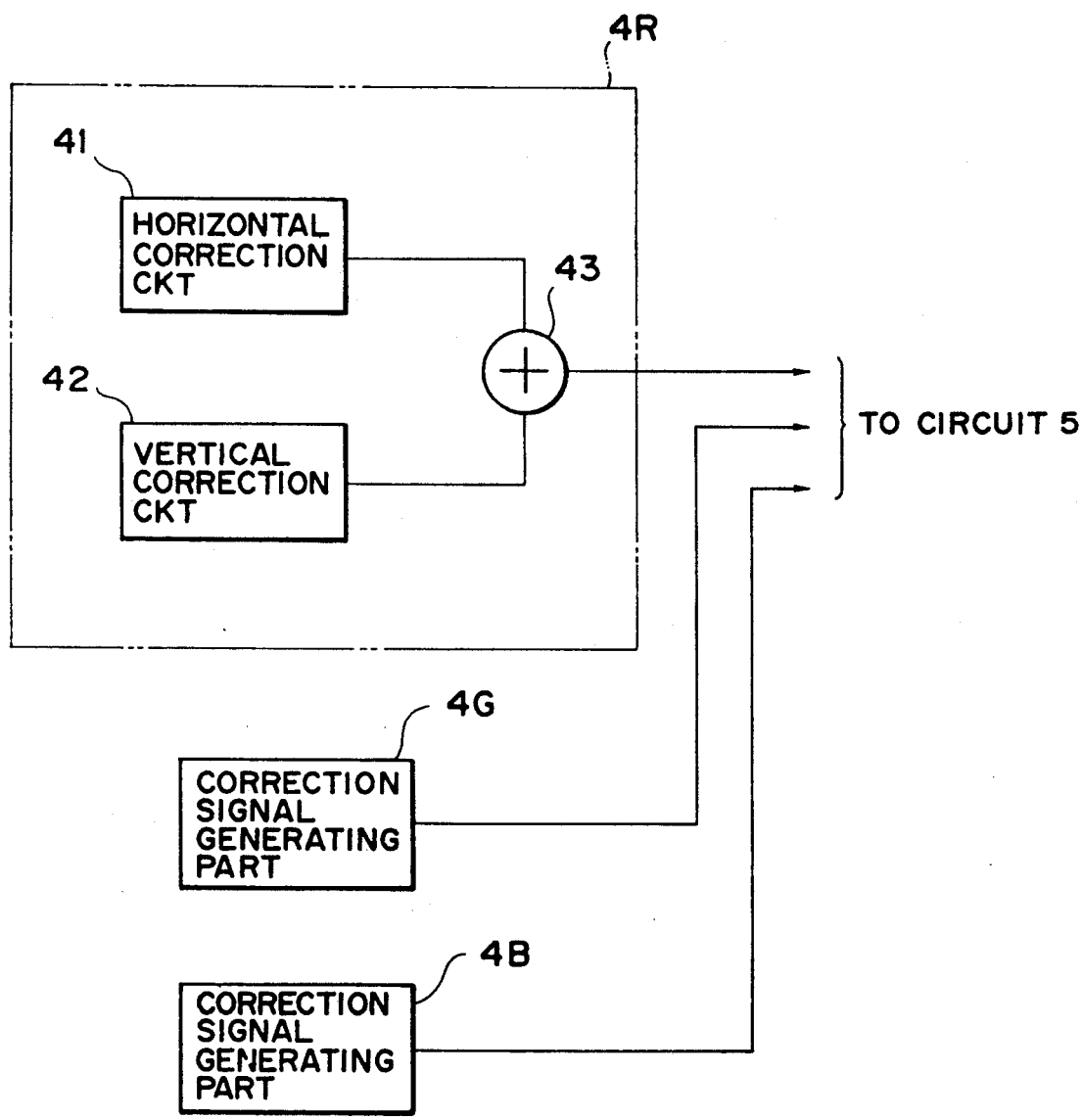

F I G. 3A 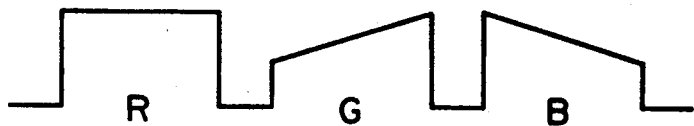
F I G. 3B 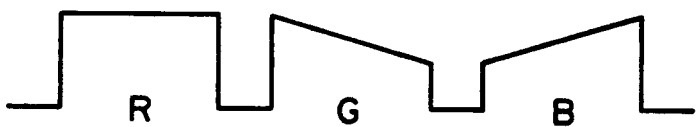
F I G. 3C 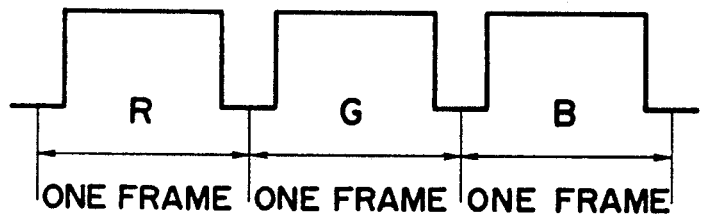
F I G. 4 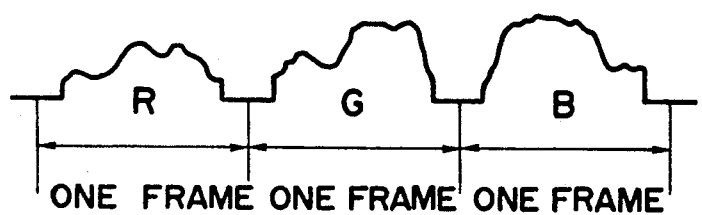

COLOR CAMERA OF SURFACE-SEQUENCE SYSTEM

BACKGROUND OF THE INVENTION

1. Field of the Invention

The present invention relates to a color camera of a surface-sequence system to perform color separation by the use of a rotational filter.

2. Related Background Art

Traditionally, a color camera of a surface-sequence system uses a rotational filter to separate the incident light from an object into the light compositions of three primary colors, red, green, and blue.

The rotational filter comprises three filtering parts (hereinafter referred to as R, G, and B respectively) formed by dividing the circular filter into three regions each with a ⅓ circle to transmit red light, green light, and blue light respectively while shielding any other light.

Then, by transmitting an object image converged by an optical lens through the rotational filter to form its image on the image pick up plane of an image pick up element, image signals are obtained. With the rotation of the rotational filter, the object image is allowed to pass sequentially through each of R, G, and B parts of the filter. Accordingly, the image having each of the light compositions, red, green, and blue, of the object image can sequentially be formed on the image pick up element.

The image pick up element converts the image thus formed with each of the light compositions, red (R), green (G), and blue (B) into the respective electrical color signal (R signal, G signal, and B signal) and outputs each of them sequentially. Each color signal is amplified by an amplifier. The amplifier employed is capable of varying its amplification factor.

Then, in order to correct the particular characteristics of the image pick up element against each of the color signals, shading correction signals are generated by a correcting signal generating CKT, thereby varying the amplification factors to correct the image signals.

In the conventional technique set forth above, the image pick up is performed by one image pick up element, and particular shading corrections required for the image pick up optical system and image pick up element are performed for each of the R, G, and B color signals in the same fashion.

There is a problem encountered, however, that the correction cannot be made accurately when the same shading correction is applied to each of the R, G, and B color signals because the light transmission factors of the material of the rotational filter 1 are not even, and at different positions on the rotational filter 1 the transmission factors vary.

SUMMARY OF THE INVENTION

An object of the present invention is to provide an apparatus for correcting image signals capable of performing an accurate shading correction for each of the R, G, and B color signals.

With a view to solving the above-mentioned problem, a color camera of a surface-sequence system according to the present invention comprises a rotational filter having a plurality of filtering parts respectively for the R, G, and B color signals, image pick up means for sequentially converting the incident light transmitted from an object image through the rotational filter into each of the electrical color signals, amplifying means capable of varying amplification factors for amplifying each of the color signals from the image pick up means, and correcting means for controlling the amplification factors of the amplifying means in accordance with each of the characteristics of the plural filtering parts of the rotational filter when each of the color compositions of image signals is amplified by the aforesaid amplifying means.

With a structure such as above, the incident light from an object is transmitted through the rotational filter to be separated into each of the color compositions, which is formed sequentially on pick up means to be converted into each color signal Then, when each color signal is amplified, correcting means controls the amplification factor for each filtering part of the rotational filter, thereby making it possible to correct the image signal accurately for the color signal in accordance with the filter characteristic.

BRIEF DESCRIPTION OF THE DRAWINGS

FIG. 1B is a block diagram showing in detail a part of the embodiment shown in FIG. 1A;

FIGS. 3A to 3C are a view showing a method of forming correcting signals; and

FIG. 4 is a view showing an example of output waveforms of image signals.

DETAILED DESCRIPTION OF THE PREFERRED EMBODIMENT

Figure 1A:
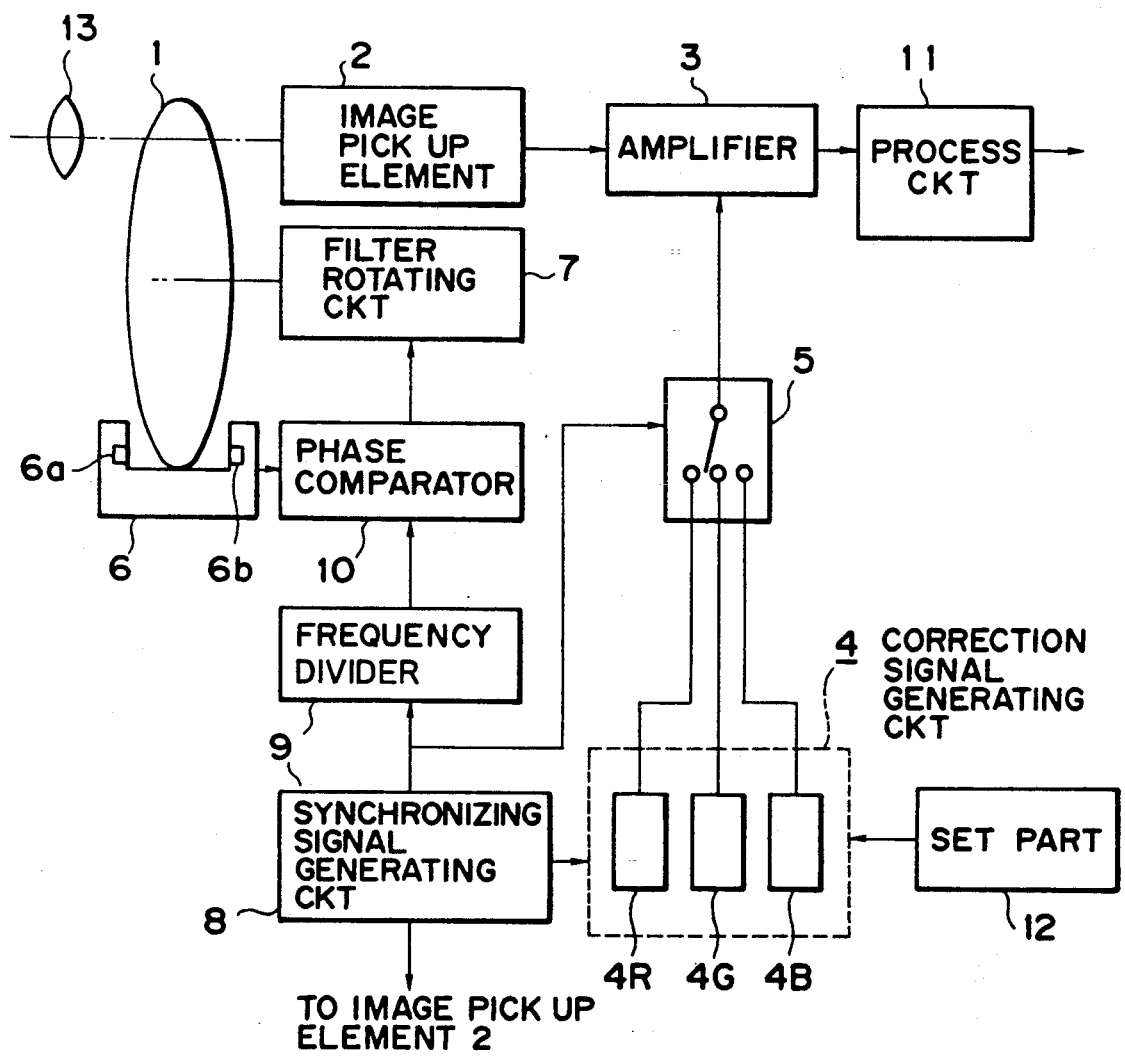
FIG. 1A is a block diagram schematically showing a color camera of a surface-sequence system according to an embodiment of the present invention.

In FIG. 1A, an object image converged by a condenser lens 13 is transmitted through rotational filter 1 and formed on the pick up plane of pick up element 2.

Figure 2:
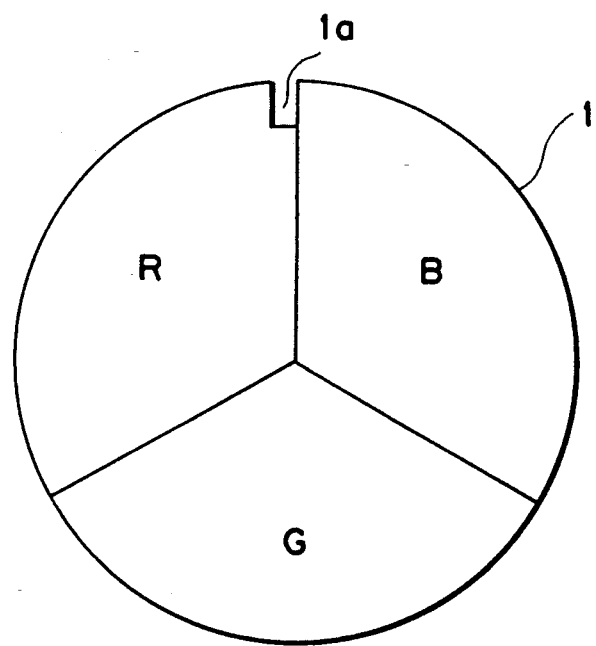
FIG. 2 is a structural view showing a rotational filter.

Rotational filter 1 is arranged to be rotated by filter rotating circuit 7 in front of image pick up element 2, and is structured as shown in FIG. 2. In FIG. 2, marks R, G, and B designate each of the filtering parts, which allows the red light, green light, and blue light to pass respectively therethrough, while shielding any other light. Slit 1a is provided at one boundary position of the peripheries of R, G, and B.

When rotational filter 1 is rotated by filter rotating circuit 7, each of the images having the light compositions of red, green, and blue of the object image is sequentially formed on the image pick up plane of image pick up element 2 by transmitting the object image sequentially through the respective filtering parts, R, G, and B.

Image pick up element 2 converts the object image formed on the image pick up plane into electrical image signals including R signal, G signal, and B signal in synchronism with synchronizing signals generated by synchronizing signal generating CKT 8.

Amplifier 3 receives each color signal output from image pick up element 2 to amplify it. At this juncture, the amplifier varies its amplification factor in accordance with a controlling signal inputted thereinto. The structure is so arranged that the higher the phase of the controlling signal is, the greater becomes the amplification factor. Each of the color signals thus amplified is inputted into process circuit 11.

Correcting signal generating CKT 4 comprises correcting signal generating parts 4R, 4G, and 4B. Correcting signal generating parts 4R, 4G, and 4B output shading correction signals respectively for correcting the shading characteristics of rotational filter 1 for red light, green light, and blue light and the particular characteristics of image pick up element 2 in synchronism with the horizontal synchronizing signal and vertical synchronizing signal from synchronizing signal generating CKT 8. This shading correction signal is inputted into amplifier 3 as the aforesaid control signal to amplify the image signal in accordance with the amplitude of the shading correction signal.

Set part 12 enables correction to be set manually in accordance with the shading characteristics.

Switching circuit 5 is provided for switching shading correction signals output to amplifier 3 from correcting signal generating parts 4R, 4G, and 4B and outputting the shading correction signals from the three correcting signal generating parts 4R, 4G, and 4B to amplifier 3 by switching them sequentially each time the vertical synchronizing signal is inputted from synchronizing signal generating CKT 8.

Therefore, the amplification factor of amplifier 3 is varied by the shading correction signals output from correcting signal generating parts 4R, 4G, and 4B to correct each of the color signals.

Detector 6 comprises light emitting part 6a and light receiving part 6b to detect the rotation of rotational filter 1. Usually, the light from light emitting part 6a is not detected by light receiving part 6b because the light is shielded by rotational filter 1. However, when rotational filter 1 is rotated so that slit 1a comes to the light path across light emitting part 6a and light receiving part 6b, the light from the light emitting part 6a reaches light receiving part 6b, and is detected. Then, detector 6 outputs a pulse signal.

Synchronizing signal generating CKT 8 outputs the vertical synchronizing pulse signal to indicate the starting of a frame in reading the image signals.

Frequency divider 9 divides the vertical synchronizing pulse signal output from synchronizing signal generating CKT 8 into a signal corresponding to one third of a circle defined by the rotational filter.

Phase comparator 10 compares the phases of the pulse signal from detector 6 and the vertical synchronizing pulse signal for the divided circle from frequency divider 9, and transmits the controlling signal to filter rotating CKT 7 to synchronize the timing with which the vertical synchronizing pulse signal for the divided circle is generated and the rotation of rotational filter 1.

As shown in FIG. 1B, correcting signal generating part 4R comprises horizontal correction CKT 41 which repeatedly outputs the horizontal amplifying correction signal in the cycle of one horizontal scanning period in synchronism with the horizontal synchronizing signal from synchronizing signal generating CKT 8, vertical correction CKT 42 which repeatedly outputs the vertical amplifying correction signal in the cycle of one frame period in synchronism with the vertical synchronizing signal from synchronizing signal generating CKT 8, and adder 43 which outputs the signal from horizontal correction CKT 41 and the signal from vertical correction CKT 42 to switching circuit 5 after adding them. Correcting signal generating parts 4G and 4B are also structured in the same manner as correcting signal generating part 4R. The signal from horizontal correction CKT 41 is adjustable by the operation of set part 12 in that the signal is varied over one horizontal scanning period while the signal from vertical correction CKT 42 is also adjustable by the operation of set part 12 in that the signal is varied over one frame period. The correcting adjustment in the horizontal correction CKT is possible, for example, either by setting the amplification factor per pixel in one horizontal scanning line as digital data in a memory in the correcting signal generating part by the operation of set part 12, or by providing respective variable registers in set part 12 and by combining plural signal generating CKTs in which waveforms can be varied by adjusting a plurality of registers. The correcting adjustment in the vertical correction CKT is possible, for example, either by setting the amplification factor per one horizontal scanning line as digital data in a memory in correcting signal generating CKT by the operation of set part 12 or by providing respective variable registers in set part 12 and by combining plural signal generating CKTs in which waveforms can be varied by adjusting a plurality of registers.

FIG. 4 is a view showing an example of waveforms output by the image signals having R signal, G signal, and B signal. Marks R, G, and B in FIG. 4 designate respectively R signal, G signal, and B signal, i.e., the output image signals each having the composition of light passing through the respective filtering parts R, G, and B. In this respect, the representation of FIG. 4 is simplified by omitting the horizontal blanking period of a scanning beam, etc.

FIG. 3 is a view showing the method of forming shading correction signals.

Now, let it be assumed that the light transmission factor of rotational filter 1 is not even, causing the output image signal to show a state such as shown in FIG. 3A when the incident light from a white object image is transmitted therethrough. Fundamentally, the image signal of the white incident light should produce a waveform such as shown in FIG. 3C, but the distribution of light transmission factors of G and B on rotational filter 1 is not even, and the shading characteristics of colors differ from one another. In order to correct them to obtain a signal such as shown in FIG. 3C, the waveforms of correcting signals output from correcting signal generating parts 4R, 4G, and 4B should respectively be made to produce R, G, and B shown in FIG. 3B. The output of adder 43 shown in FIG. 1B corresponds to R shown in FIG. 3B.

Correcting signal generating parts 4R, 4G, and 4B should be set to output the correcting signals which produce the waveforms enabling the amplification factor of amplifier 3 to form a waveform such as shown in FIG. 3C for the image signal output from white light.

For a color camera of a surface-sequence system of such construction as above, the operation thereof will be described.

To simplify the description, it is assumed that the scanning of image pick up element 2 is of non-interlace.

At first, when synchronizing signal generating CKT 8 outputs the vertical synchronizing pulse indicating the starting of a frame, frequency divider 9 receives it and divides it into a signal for one third of a circle which is output to phase comparator 10. While filter rotating CKT 7 causes rotational filter 1 to be rotated, the image formed on image pick up element 2 is timed by the timing with which the vertical synchronizing pulse is generated, and converted into the color signals. Therefore, in order to obtain the three kinds of color signals R, G, and B, rotational filter 1 should be arranged to complete one revolution while the vertical synchronizing pulse is generated three times.

Each time rotational filter 1 completes one revolution, slit 1a crosses the light path across light emitting part 6a and light receiving part 6b, so that the pulse signal is output from detector 6 while the pulse signal divided for one third of a circle of the vertical synchronizing pulse is output from frequency divider 9. Hence, in phase comparator 10, the phases of these two kinds of pulse signals are compared, and the controlling signal is transmitted to filter rotating CKT 7, thus making it possible to match the timings of the generation of vertical synchronizing pulses and the rotation of rotational filter 1.

On the other hand, the vertical synchronizing pulse output from synchronizing signal generating CKT 8 is also inputted into switching circuit 5, and each time the vertical synchronizing pulse is inputted, switching circuit 5 is caused to switch the shading correction signals output to amplifier 3.

Then, to amplifier 3, the R signal, G signal, and B signal are sequentially inputted from image pick up element 2 by the timing with which the vertical synchronizing pulse is generated and at the same time, the shading correction signals for the respective color signals are inputted from switching circuit 5 as controlling signals by the same timing with which the respective color signals are inputted. Then, amplifier 3 performs the amplifying processes for the respective color signals while varying the amplification factors based on the controlling signal thus received.

Each amplified color signal is output to process CKT 11, and is further output to the outside after various signal processes are performed in process CKT 11.

Also, a structure such as shown in the present embodiment, which enables controlling the amplification factors by the correcting signals having different waveforms for the respective color signals, is applicable to corrections other than the characteristic correction of the rotational filter. For example, in the case where the spectral sensitivity characteristic of image pick up element 2 for each of red, green, and blue lights is not even, the structure can be arranged to generate the correcting signals having different waveforms for the respective color signals in response to the spectral sensitivity characteristic of image pick up element 2 in the construction of the present embodiment.

I claim:

1. A color camera of a surface-sequence system comprising:

a rotational filter having a plurality of filtering parts capable of transmitting only specific color compositions of incident light from an object, the incident light from the object being transmitted sequentially through said plurality of filtering parts;

image pick up means for sequentially converting the incident light transmitted through said rotational filter from the object, which is separated into the respective color compositions when transmitted through said rotational filter, into respective color signals;

amplifying means for amplifying said respective color signals; and shading correcting means for adjusting an amplification factor of said amplifying means in accordance with characteristics of said plurality of filtering parts of said rotational filter, said shading correcting means having a plurality of correction signal generating means for generating correction signals corresponding to said plurality of filtering parts, respectively, and switching means responsive to the rotation of said rotational filter for selecting one of said plurality of correction signal generating means, corresponding to one of said plurality of filtering parts which is between the object and said image pick up means, and transferring a correction signal therefrom to said amplifying means for adjusting said amplification factor, said plurality of correction signal generating means generating said correction signals independently of said amplifying means.

2. A color camera according to claim 1, wherein said plurality of correcting signal generating means comprises, respectively, horizontal correction means for repeatedly outputting a horizontal correction signal in synchronism with a horizontal synchronizing signal, vertical correction means for repeatedly outputting a vertical correction signal in synchronism with a vertical synchronizing signal, and adding means for outputting said horizontal correction signal and said vertical correction signal to said switching means after adding them.

3. A color camera of a surface-sequence system according to claim 2, which further comprises setting means for setting said horizontal correction means and said vertical correction means in such a manner that the horizontal correction signal is varied over one horizontal scanning period and the vertical correction signal is varied over one vertical scanning period.

* * * * *